(12) United States Patent
Kwaśniewski

(10) Patent No.: US 10,837,532 B2
(45) Date of Patent: Nov. 17, 2020

(54) LINEAR ACTUATOR

(71) Applicant: Hamilton Sundstrand Corporation, Charlotte, NC (US)

(72) Inventor: Pawel Kwaśniewski, Oława (PL)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 44 days.

(21) Appl. No.: 16/143,579

(22) Filed: Sep. 27, 2018

(65) Prior Publication Data

US 2019/0101195 A1  Apr. 4, 2019

(30) Foreign Application Priority Data

Oct. 3, 2017 (EP) .................................... 17461617

(51) Int. Cl.
*F16H 25/22* (2006.01)
*F16H 25/20* (2006.01)

(52) U.S. Cl.
CPC ..... *F16H 25/2204* (2013.01); *F16H 25/2056* (2013.01); *F16H 2025/2059* (2013.01)

(58) Field of Classification Search
CPC ..................... F16H 25/2056; F16H 2025/2059
USPC ........................................... 74/89.35, 424.75
See application file for complete search history.

(56) References Cited

U.S. PATENT DOCUMENTS

| | | | |
|---|---|---|---|
| 2,660,029 A * | 11/1953 | Geyer | F15B 13/10 60/709 |
| 3,501,114 A | 3/1970 | Deplante | |
| 3,803,926 A | 4/1974 | Winter | |
| 4,730,503 A * | 3/1988 | Rosenthal | F16H 25/122 74/58 |
| 6,684,988 B2 | 2/2004 | Kapaan et al. | |
| 7,559,410 B2 * | 7/2009 | Funk | B60T 13/746 188/156 |
| 8,091,688 B2 * | 1/2012 | Reitmeier | B60T 7/085 188/156 |
| 8,201,467 B2 * | 6/2012 | Johnson | F16H 25/20 310/80 |

(Continued)

FOREIGN PATENT DOCUMENTS

| DE | 102005018003 A1 | 10/2006 |
|---|---|---|
| FR | 2856452 A1 | 12/2004 |

(Continued)

OTHER PUBLICATIONS

Extended European Search Report for International Application No. 17461617.7 dated Apr. 10, 2018, 7 pages.

*Primary Examiner* — Bobby Rushing, Jr.
(74) *Attorney, Agent, or Firm* — Cantor Colburn LLP

(57) ABSTRACT

A linear actuator comprises an actuator housing defining a bore. A drive element is received in the actuator housing bore. The drive element comprises tubular portions receiving first and second ball nuts arranged at respective distal ends thereof. The ball nuts are threaded in opposite directions to one another. The drive element further comprises a drive coupling. The actuator further comprises first and second ball screws operatively engaged with the first and second ball nuts. Rotation of the drive element and thus the ball nuts relative to said ball screws causes the ball screws to move together in a linear path in opposite directions from one another.

14 Claims, 7 Drawing Sheets

(56) References Cited

U.S. PATENT DOCUMENTS

| | | | | |
|---|---|---|---|---|
| 9,464,643 B2* | 10/2016 | Shu | ........................ | F15B 13/10 |
| | | | | 60/709 |
| 2015/0240547 A1* | 8/2015 | Fischer | .................. | F16H 25/20 |
| | | | | 74/89.4 |

FOREIGN PATENT DOCUMENTS

| | | | |
|---|---|---|---|
| JP | 2009270709 A | 11/2009 | |
| WO | 03048599 A1 | 6/2013 | |

* cited by examiner

US 10,837,532 B2

LINEAR ACTUATOR

FOREIGN PRIORITY

This application claims priority to European Patent Application No. 17461617.7 filed on Oct. 3, 2017, the entire contents of which is incorporated herein by reference.

TECHNICAL FIELD

The present disclosure relates to linear actuators and in particular to linear ball screw actuators.

BACKGROUND

Linear ball screw actuators are used in a wide range of applications. They are commonly used in aircraft applications where they are used to operate valves, control surfaces and other components.

Typically the actuator comprises a ball nut which receives a ball screw. The ball nut and ball screw are formed with respective grooves that receive ball elements which reduce the friction between the two components. Rotation of one or other of the components creates a linear motion of the other which is used to provide an actuating movement.

Typically a motor, for example a hydraulic or electric motor, is used to rotate the rotary component. The motor is typically mounted to the actuator housing. Given the large number of actuators which may be present on an aircraft, this may result in a large number of actuators and/or motors.

SUMMARY

The present disclosure provides a linear actuator. The linear actuator comprises an actuator housing defining a bore. A drive element is received in the actuator housing bore. The drive element comprises tubular portions receiving first and second ball nuts arranged at respective distal ends thereof. The ball nuts are threaded in opposite directions to one another and further comprise a drive coupling. First and second ball screws are received within the drive element and are operatively engaged with the first and second ball nuts. Rotation of the drive element and thus of the ball nuts relative to the ball screws causes the ball screws to move together in a linear path in opposite directions from one another.

In embodiments, the linear actuator may further comprise first and second tubular shield elements arranged radially outwardly from the ball screws and coupled thereto for linear movement therewith. The tubular shield elements are received in opposed ends of the actuator housing bore.

The shield elements may be arranged radially outwardly of the drive element. A linear bearing may be provided between a radially outer surface of the drive element and a radially inner surface of the shield element.

The ball nuts may be mounted in radially enlarged end sections of the drive element. In embodiments, the linear bearings may be provided between radially outer surfaces of the enlarged end sections of the drive element and the radially inner surfaces of the shield elements.

In various embodiments, seals may be provided between respective radially outer surfaces of the shield elements and respective radially inner surfaces of the actuator housing bore.

In various embodiments, respective rod end couplings may be attached to distal ends of the ball screws.

In certain embodiments, an end portion of a shield element may be located between a radially outer surface of the ball screw and a radially inner surface of a bore of the rod end coupling.

In embodiments, a seal may be provided between opposed radial surfaces of the shield element and the rod end coupling.

In various embodiments, the drive coupling of the drive element may be provided on an axially central region of the drive element, the tubular portions of the drive element extending in opposite directions from the central region.

The actuator may further comprise a drive motor having an output shaft coupled with the drive element.

The drive motor may axially overlap the drive element.

Reduction gearing may be provided between the drive motor output shaft and the drive coupling of the drive element.

In embodiments, the drive motor may be an electric motor.

In certain embodiments, the pitch of the first and second ball screws may be the same.

In other embodiments, the pitch of the first and second ball screws may be different.

In various embodiments, the drive element may comprise slots or openings formed therein.

BRIEF DESCRIPTION OF DRAWINGS

An embodiment of this disclosure will now be described, by way of example only, with reference to the accompanying drawings in which.

DETAILED DESCRIPTION

Figure 1:
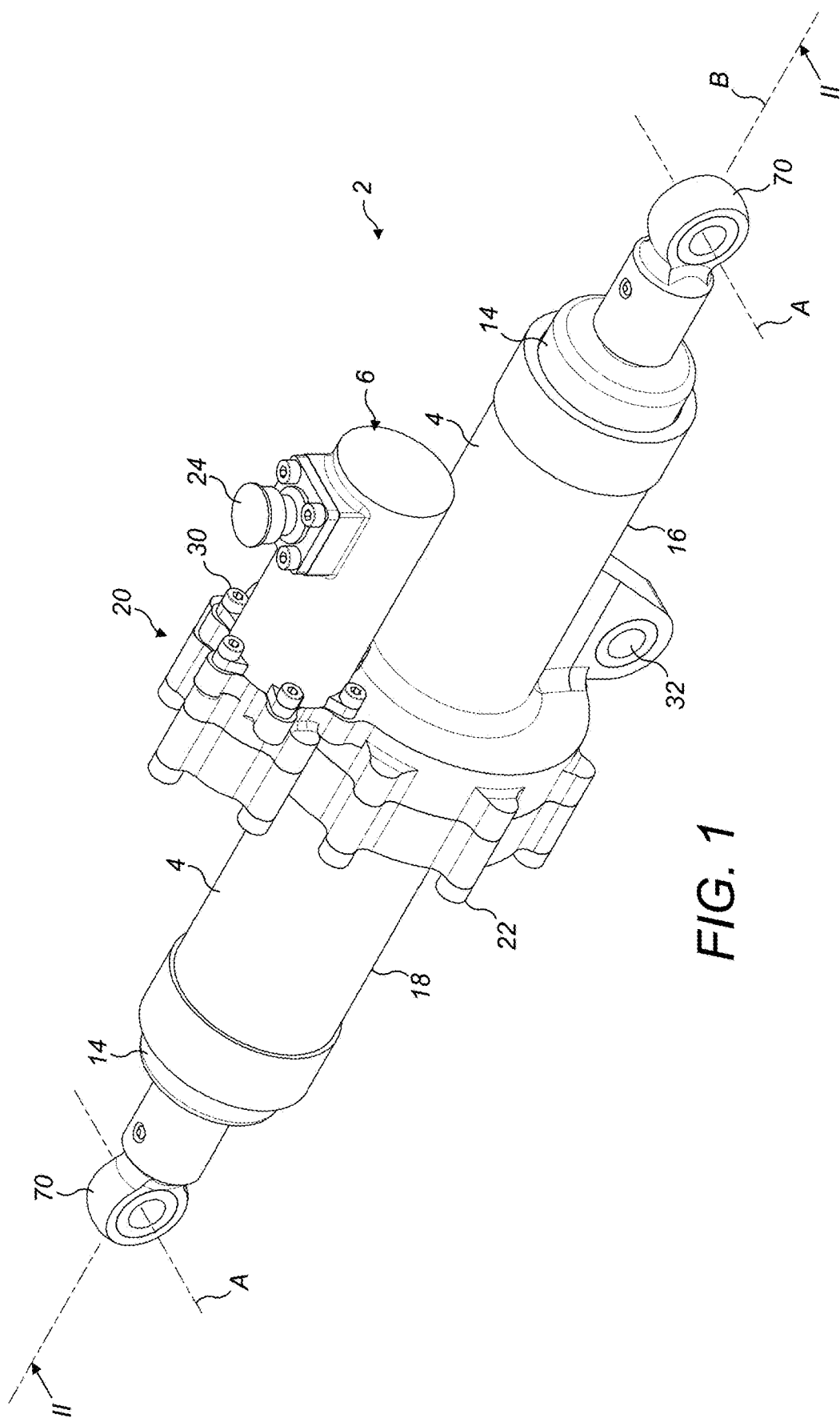
FIG. 1 shows a perspective view of an actuator in accordance with the disclosure.
Figure 2:
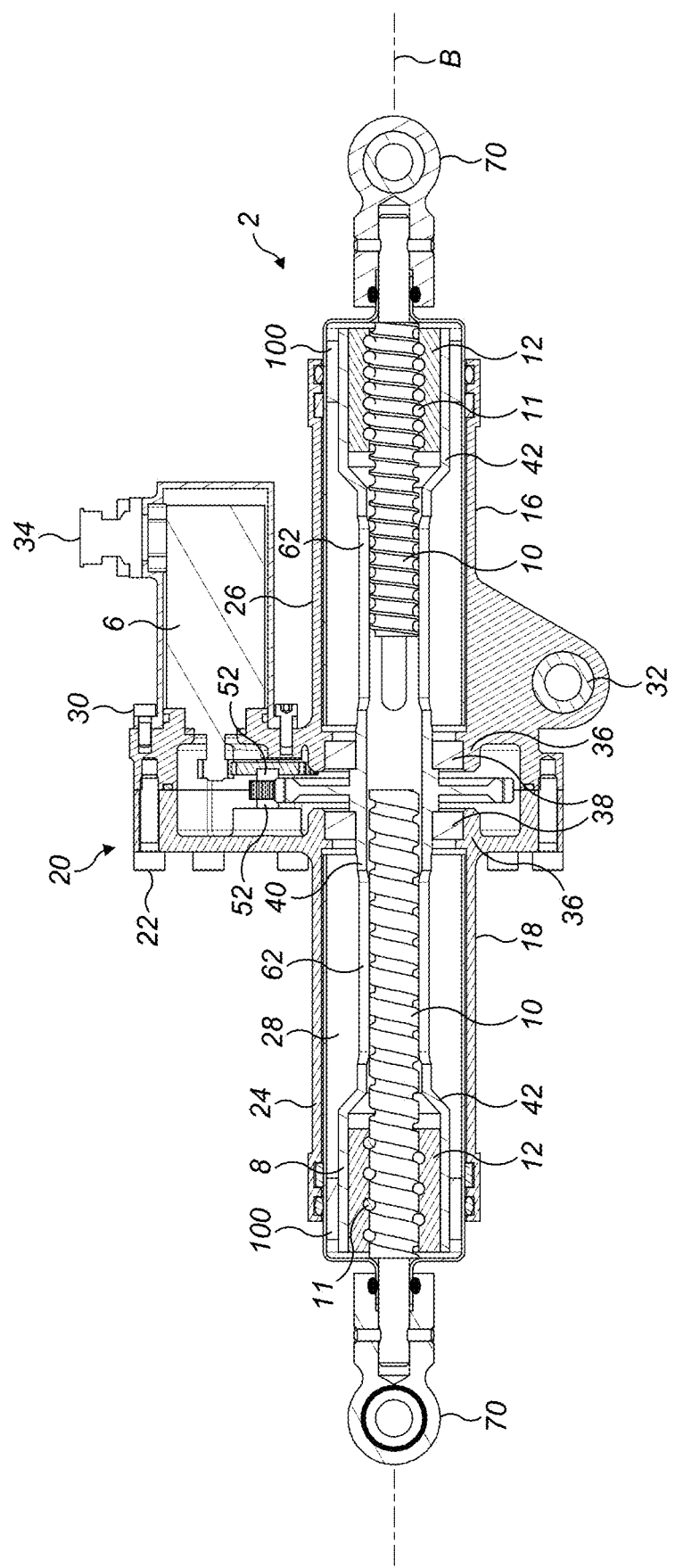
FIG. 2 shows a vertical cross-section through the actuator of FIG. 1 taken along the line II-II of FIG. 1.
Figure 3:
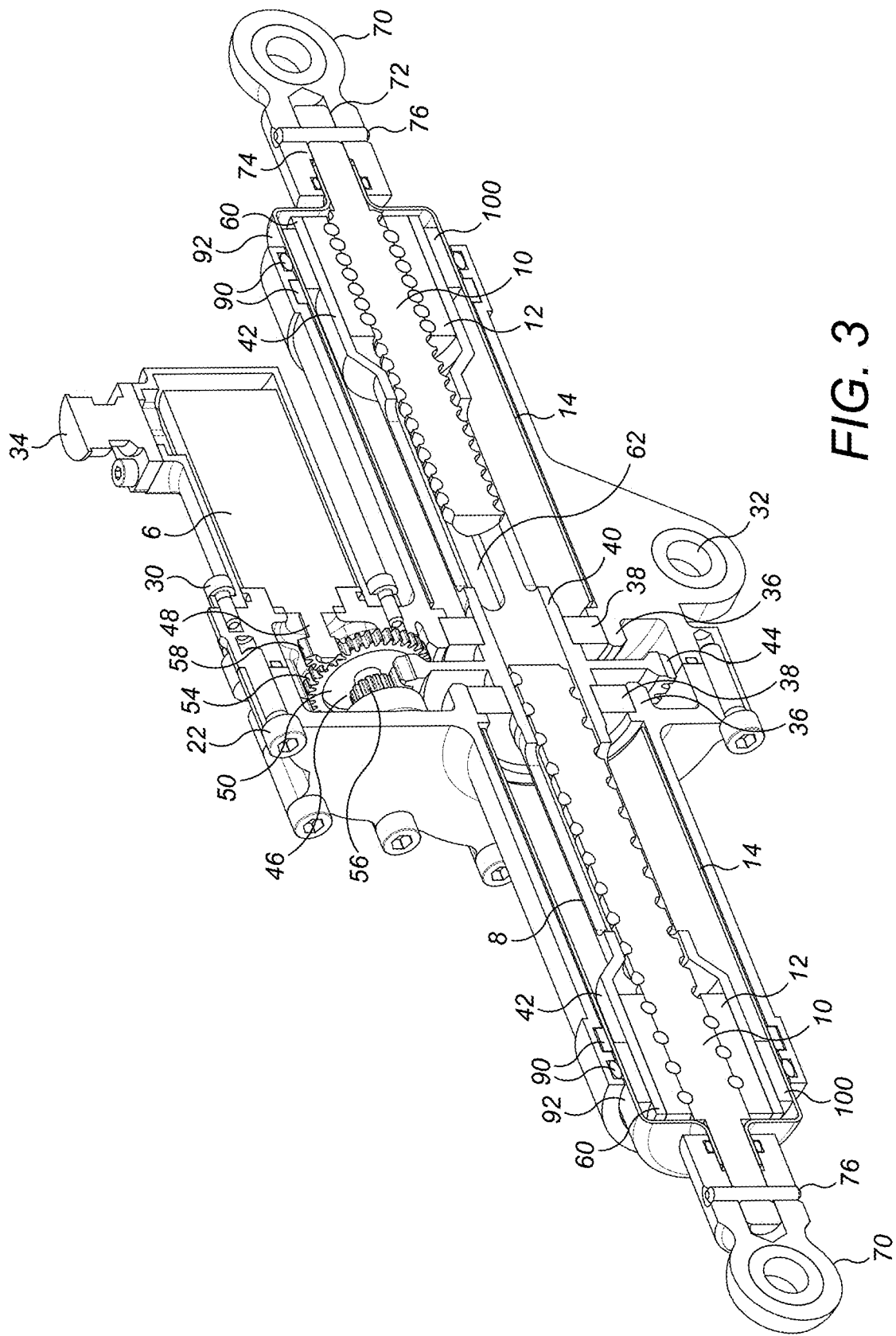
FIG. 3 shows a perspective cross-section section through the actuator of FIG. 1 taken along the line II-II.

With reference to FIGS. 1 to 3, a linear actuator 2 in accordance with this disclosure comprises an actuator housing 4, a drive motor 6 (in this embodiment an electric motor), a drive element 8 and a pair of ball screws 10. The drive element 8 is rotatably mounted in the actuator housing 4 and is provided with respective ball nuts 12 at its opposed ends for driving the ball screws 10 as will be described in further detail below. Respective shield elements 14 project from the actuator housing 4 to shield the internal components of the actuator 2 as will also be described further below.

In this embodiment, the actuator housing 4 is formed in two parts 16, 18, joined together around a peripheral central portion 20 of the housing 4 by means of bolts 22 or other fasteners. The actuator housing 4 has two generally tubular portions 24, 26, one formed by each actuator part 16, 18 which extend in opposite directions away from the central portion 20 of the actuator housing 4. Together the housing parts 16, 18 define a bore 28 for receiving other components of the actuator 2. The actuator housing parts 16, 18 may be machined components or machined castings, for example.

One of the actuator housing parts 16 mounts the drive motor 6 via bolts or other fasteners 30. One of the housing parts 16 also comprises a coupling 32, for example a pivotal coupling, for attachment of the actuator 2 to an external structure to support and prevent rotation of the actuator housing 4. The motor 6 and coupling 32 may be provided on the same housing part 16, or on different housing parts 16, 18. The motor 6 is supplied with electrical power through a suitable connector 34.

The actuator housing parts 16, 18 are each formed with a bearing seat 36 which receives a bearing 38 which support a central region 40 of the drive element 8 for rotation about a central axis B of the actuator 2.

The drive element 8 is a generally tubular element having a central region 40 and two arms 42 extending axially therefrom in opposite directions. The drive element 8 may be a cast and machined element in some embodiments. In other embodiments, the drive element 8 may be an assembly of components.

Figure 5:
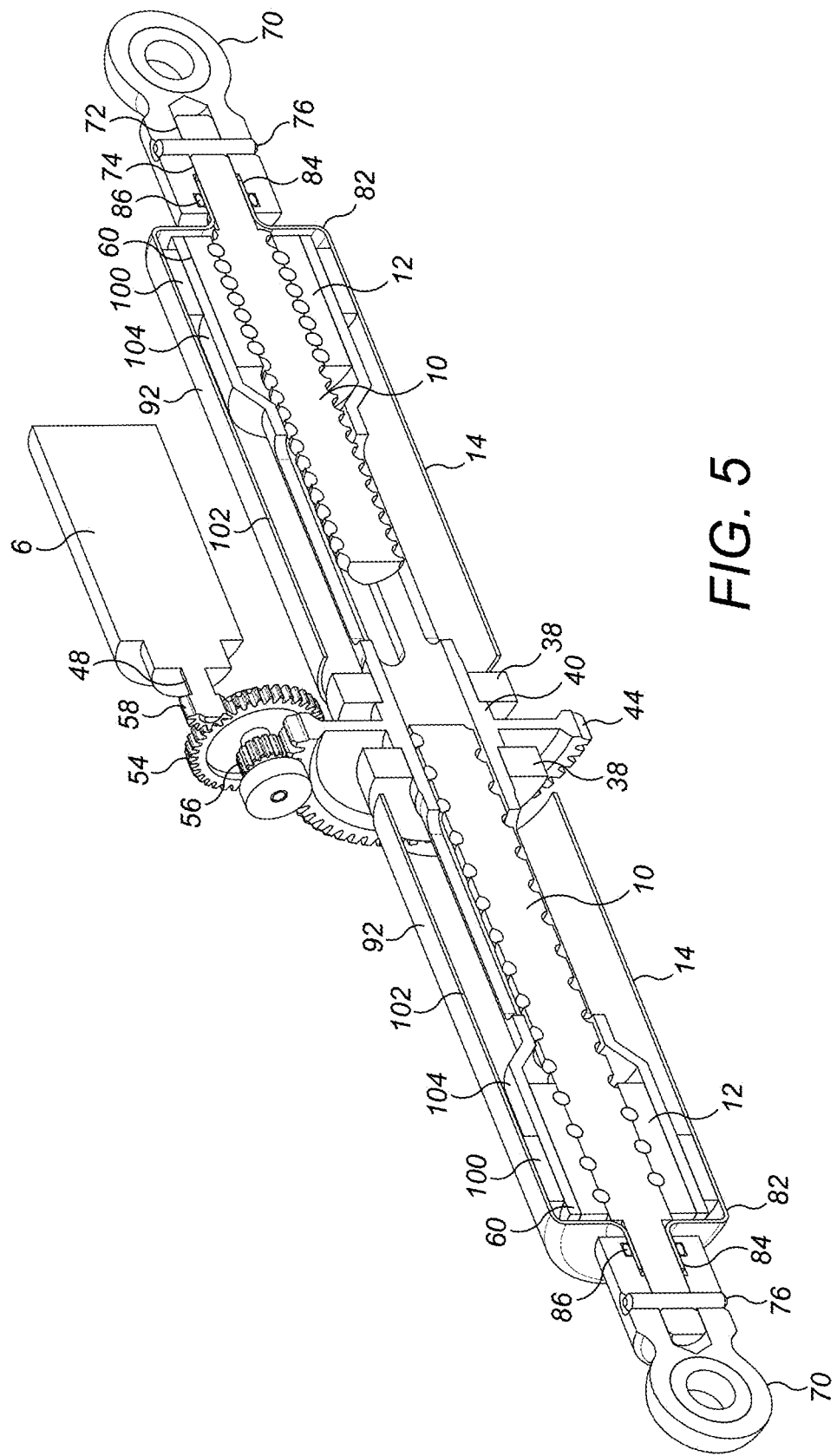
FIG. 5 shows a broken away perspective view of the actuator with certain components removed for clarity.

As can be most clearly seen in FIGS. 3 and 5, the central region 40 of the drive element 8 is formed, on its radially external surface, with a drive coupling 44. In this embodiment, the drive coupling 44 is a gear, for example a spur gear as shown, but other couplings may be used. The gear 44 engages speed reduction gearing 46 formed between an output shaft 48 of the drive motor 6 and the gear 44. In this embodiment, the speed reduction gearing 46 is a simple double gear element 50 suitably mounted in the actuator housing 2 by bearings 52 and having respective sets of gear teeth formed on gear wheels 54, 56 for engaging the drive gear 44 and a pinion gear 58 formed on the motor output shaft 48. The speed reduction gearing 46 will also act to increase the torque applied to the drive element 8. The gear ratio may, for example, be set by choosing appropriate gear wheels 54, 56. In this embodiment, the larger diameter gearwheel 54 is located axially between the drive gear 44 and the actuator housing 4. In various embodiments, the speed reduction gearing may comprise one or more additional gears to those shown to provide the desired reduction ratio.

The drive element arms 42 each have a radially enlarged distal end 60. Openings 62, in this embodiment axially extending slots 62, are provided in the arms 42 between the central portion 40 and the distal ends 60. This reduces the weight of the drive element 8. Other forms of openings 62 may be provided as appropriate.

The enlarged distal ends 60 of the drive element arms 42 each receive a ball nut 12. The ball nuts 12 may, for example, be press fitted into the distal ends 60 of the drive element arms 42, although any form of mounting may be used provided it transmits rotational movement of the drive element 8 to the ball nuts 12.

The ball nuts 12 each receive and support a respective ball screw 10. As is known in the art, the ball nut 12 and ball screw 10 have respective helical threads which receive ball elements 11 allowing low friction relative rotational movement between the ball nut 12 and the ball screw 10. The ball nuts 12 may be recirculating ball nuts as known in the art.

In accordance with this disclosure, the ball nut 12 mounted on the distal end 60 of one drive element arm 42 and the ball nut 12 mounted on the distal end 60 of the other drive element arm 42 are threaded in opposite directions. The effect of this is that when the drive element 8 is rotated, the ball screws 10 will move linearly in opposite directions to each other, one direction of rotation leading to extension of both ball screws 10 from the actuator housing 4 and the other direction of rotation leading to retraction of both ball screws 10 into the actuator housing 4. This constitutes a so-called turnbuckle mechanism.

Figure 4:
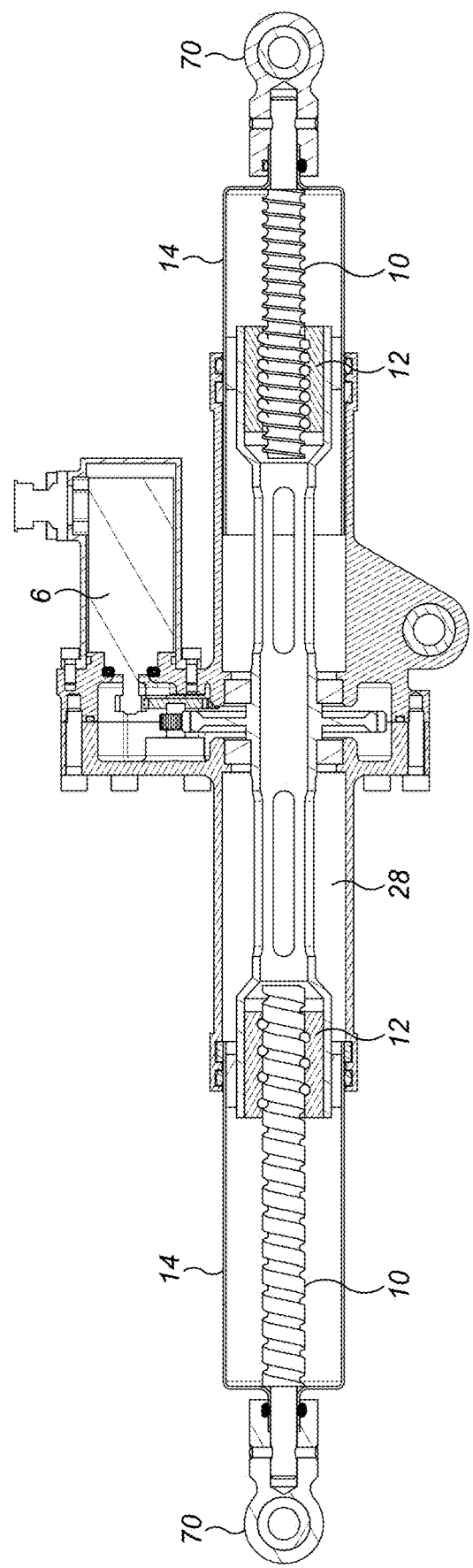
FIG. 4 shows a vertical cross-section through the actuator in its extended position.

The relative speed of movement of the ball screws 10 will be determined by the pitch of the threads on the ball screws 10 (and therefore on the ball nuts 12). For example in this embodiment, one ball screw 10 has a smaller pitch than the other ball screw 10. The ball screw 10 with the smaller pitch will move less far and at a slower speed per rotation of the drive element 8. This is illustrated in FIGS. 2 and 4 of the application.

Each ball screw 10 is provided with an end coupling 70 for coupling the ball screw 10 to an external body requiring actuation. As illustrated, the end coupling 70 may be a pivotal coupling. The end coupling 70 may comprise a bore 72 received over an end surface 74 of the ball screw 10. The end coupling 70 may, in some embodiments, be press fitted to the ball screw end surface 74. Alternatively, or additionally, the end coupling 70 may be fastened to the ball screw by a fastener, such as a pin 76 as illustrated. Any fastening which prevents relative rotation between the end coupling 70 and ball screw 10 may be used. End couplings for ball screws 10 are widely used in the art and need not therefore be described in any further detail.

It will be appreciated that the actuator 2 may be exposed to a harsh operating environment (for example on aircraft). To protect the actuator 2, shield elements 14 are provided.

Each shield element 14 comprises a tubular body 80 which is received within the bore 28 of the actuator housing 4, around the drive element 8. The shield element also has a closed distal end 82. The distal end 82 of the shield element 14 is attached to the ball screw 10 for linear motion therewith. In this embodiment, the distal end 82 of the shield 14 is formed with an axially extending sleeve 84 which is received between the end surface 74 of the ball screw 10 and the bore 72 of the end coupling 70. A seal 86, for example an O-ring, may be provided, as shown, between the sleeve 84 and the end coupling bore 72. A further seal (not shown) such as an O-ring may also be provided between the sleeve 84 and the end surface 74. This prevents ingress of contaminants into the actuator 2 along the interface between the shield element 14 and the ball screw 10.

As can be seen most clearly in FIG. 3, one or more sliding seals 90 may be provided between a radially outer surface 92 of the shield element 14 and the actuator housing 4 to prevent ingress of contaminants into the actuator housing 4. The actuator housing 4 may be provided with one or more annular grooves 94 to accept the seals 90. The seals 90 may be arranged at the distal ends of the actuator housing 4.

As can be seen most clearly in FIG. 5, respective linear bearings 100, for example of a low friction material such as PTFE, are provided between a radially inner surface 102 of each shield element 14 and a radially outer surface 104 of the enlarged distal ends 60 of the drive element arms 42. The linear bearings 100 allow the shield elements 14 to move in a linear manner into and out of the actuator housing 4 while allowing rotation of the drive element 8 relative to the shield elements 14. The linear bearings 100 are suitably attached to the drive element 8. The linear bearings 100 also act, to some extent, to support the enlarged ends 60 of the drive element 8.

The shield elements 14 may be made from any appropriate material. For example they may be formed of a plastics material, for example an injection moulded plastics material or a metal material, for example a die pressed or hydroformed metal material.

Installation and operation of the actuator 2 will now be described.

The actuator 2 is mounted to a fixed support by means of the coupling 32. The ball screws 10 are attached to respective elements to be actuated by means of the end couplings 70. The couplings 70 may allow rotational movement of the ball screws 10 around a pivot axis A, but prevent rotational movement of the ball screws 10 about their longitudinal axes B. In other embodiments, other means may be provided to prevent rotational movement of the ball screws 10 about their longitudinal axes B. For example, a non-rotating coupling 110 may be provided between the ball screw 10 and the actuator housing 4.

Figure 6:
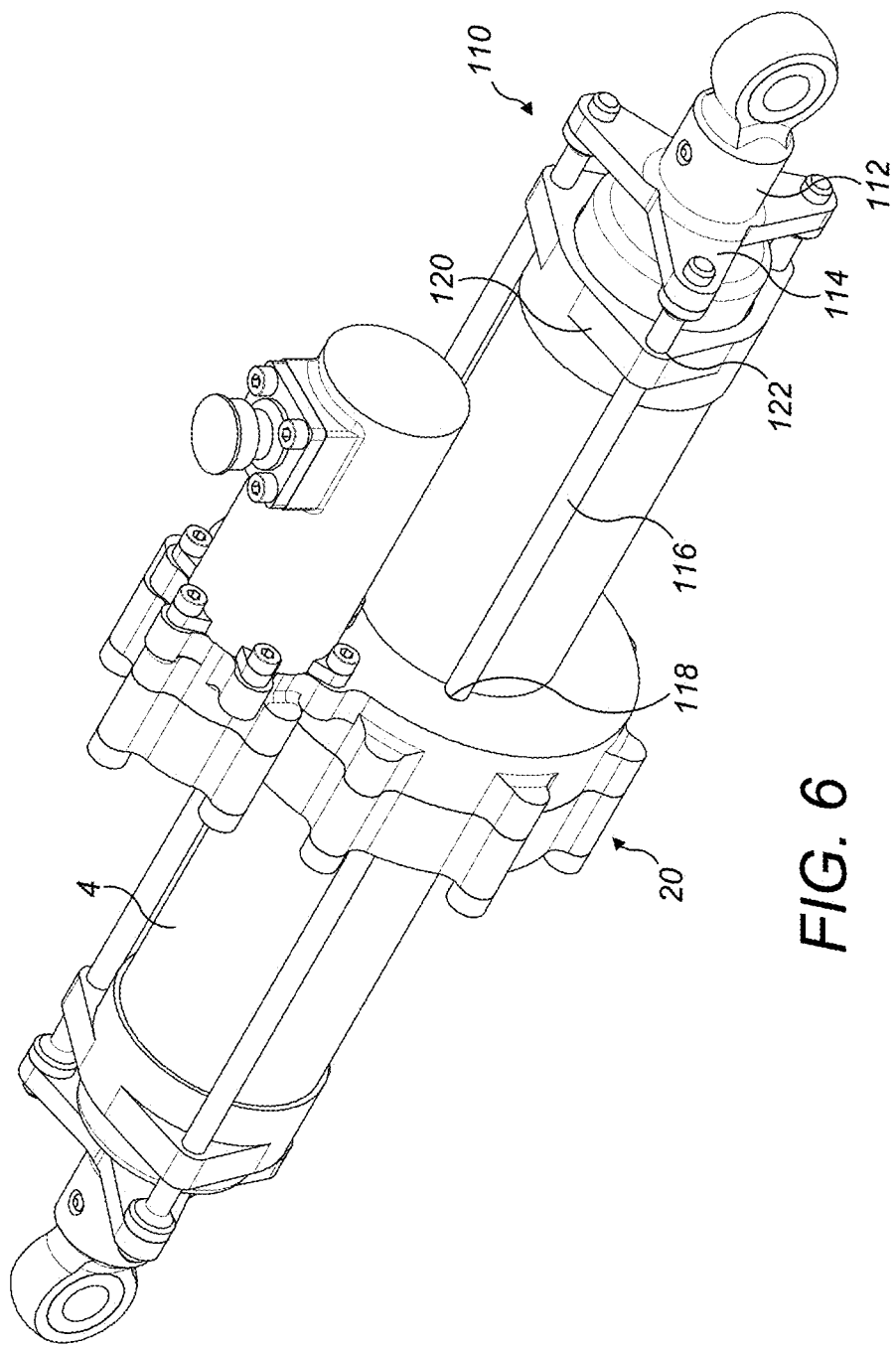
FIG. 6 shows a second embodiment of actuator in accordance with the disclosure.
Figure 7:
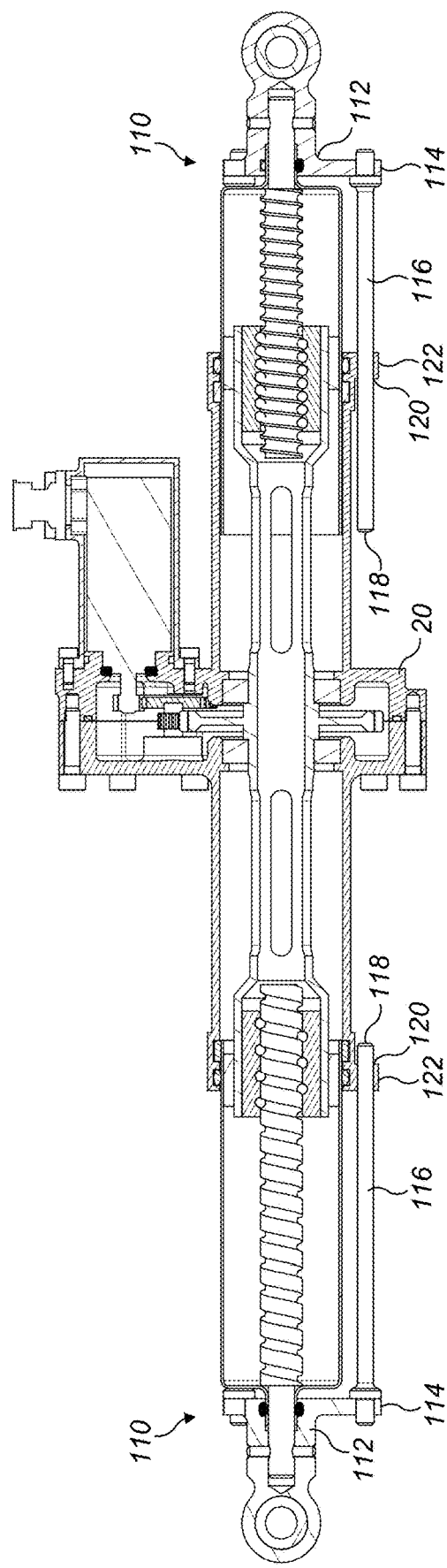
FIG. 7 shows a sectional view of the actuator of FIG. 6 in an extended condition.

One suitable coupling mechanism 110 is illustrated in the embodiment of FIGS. 6 and 7. In this embodiment, the ball screw 10 may be provided with a collar 112 at its distal end. The collar 112 may be integrally formed with the end coupling 70 in certain embodiments, or formed as a separate component therefrom in others. The collar 112 is rotationally fixed to the ball screw 10 such that it may not rotate relative thereto.

The collar 112 comprises at least one lug 114, for example a plurality of lugs 114. In this embodiment, there are three lugs 114. The lugs 114 may be circumferentially equally spaced as shown. Each lug 114 mounts a rod 116 which extends axially towards the central portion 20 of the actuator housing 4. In the retracted position shown in FIG. 6, the distal end 118 of each rod 116 lies substantially adjacent the central portion 20.

The actuator housing 4 also comprises at least one lug 120 on its radially outer distal end. The actuator housing lugs 120 correspond in number and circumferential spacing to the number and circumferential spacing of the lugs 114 and rods 116 of the ball screw 10. Each actuator housing lug 120 comprises a bore 122 slidingly receiving a respective rod 116, such that as the actuator is operated, the rods 116 may move axially in the bores 122, thereby allowing extension and retraction of the ball screw 10, but preventing its rotation relative to the actuator housing 4.

Of course other couplings 110 may be provided. The remaining details of the embodiment of FIGS. 6 and 7 is the same as that of the first embodiment, so it need not be described again in detail.

In order to extend the actuator 2 from its retracted position illustrated in FIGS. 2 and 3, power is supplied to rotate the motor 6 in a first direction. The rotation of the motor 6 is transmitted to the drive gear 40 of the drive element 8 through the reduction gearing 46. Rotation of the drive element 8 causes rotation of the ball nuts 12. As the ball screws 10 are prevented from rotating about their longitudinal axes B, rotation of the ball nuts 12 will cause the ball screws 10 to move in a linear manner from their retracted positions in which they are received within the hollow tubular arms 38 of the drive element 8 to an extended position. The fully extended position is shown in FIG. 5. The movement in opposite linear directions is due to the threads on the ball nuts 12 and the associated ball screws being in opposite directions.

The degree of extension of the ball screws 10 can be controlled by the number of revolutions of the motor 6. Thus in certain embodiments, the motor 6 may be provided with a resolver or other position or rotational sensor which may be connected to a suitable control unit. The end positions of the ball screws 10 may be set by means of position sensors (not shown) connected to the motor control. Physical stops (also not shown) may also be provided to prevent overextension of the actuator 2.

To retract the ball screws 10, the direction of rotation of the motor 6 is simply reversed, causing rotation of the ball nuts 12 in the opposite direction and thus linear movement of the ball screws in the opposite direction.

It will be seen from FIGS. 4 and 5 that the shields 14 protect the ball screws 10 and ball nuts 12 from the external environment in both the retracted and extended states of the actuator 2. This is of particular importance in harsh operation conditions such as may be encountered on aircraft.

It will be appreciated that embodiments of the disclosure may provide certain advantages. The use of a single motor 6 to move two ball screws 10 reduces the number of motors 6 required in multi-actuator systems. This may provide a significant weight saving.

The design may be readily adapted for different applications. The stroke and speed of movement of the ball screws 10 from one application to the other may be modified by modifying the pitch of the ball screws 10 and ball nuts 12. In the embodiment illustrated the pitch of one ball screw/ball nut set is different the pitch of the other, meaning that the stroke and speed of movement of the two ball screws 10 is different. However, if a symmetrical movement is required, the pitches may be set to be the same. In the illustrated embodiment, an extension of about 35% can be achieved. With a symmetrical arrangement, an extension of 50% or more may be achievable. The torque applied to the drive element can be changed by changing the motor 6 and/or changing the speed reduction gearing 46, for example by changing the relative numbers of teeth and/or the number of gears in the reduction gearing 46.

It will also be noted that the motor 6 is arranged in a central position of the actuator 2 rather than at an end thereof, as with a more traditional actuator. This may allow the actuator 2 to be mounted in restricted areas.

The actuator 2 may be used in a wide range of applications. For example, it can be used in an aircraft, for example in the operation of air conditioning and control systems. However, its application is not limited to such and it may be used in a wide range of applications, airborne and land-based.

It will be appreciated that the embodiment described above is an exemplary embodiment only and that modifications may be made thereto without departing from the scope of the disclosure. For example, while the drive element 8 has slots 62 and enlarged end portions 60, which may reduce the weight of the drive element, the drive element 8 may be of a generally constant diameter and have no openings 62 formed therein.

The invention claimed is:

1. A linear actuator comprising:
    an actuator housing defining a bore;
    a drive element received in the actuator housing bore, said drive element comprising tubular portions receiving first and second ball nuts arranged at respective distal ends thereof and threaded in opposite directions to one another and further comprising a drive coupling;
    first and second ball screws received within the drive element and operatively engaged with said first and second ball nuts, whereby rotation of said drive element and thus of said ball nuts relative to said ball screws causes said ball screws to move together in a linear path in opposite directions from one another; and
    first and second tubular shield elements arranged radially outwardly from said ball screws and coupled thereto for linear movement therewith, said shield elements being received in opposed ends of said actuator housing bore, wherein said shield elements are arranged radially outwardly of said drive element, and wherein a linear bearing is provided between a radially outer surface of said drive element and a radially inner surface of said shield elements.

2. A linear actuator as claimed in claim 1, wherein said ball nuts are mounted in radially enlarged end sections of said drive element and wherein said linear bearings are provided between radially outer surfaces of said enlarged end sections of said drive element and said radially inner surfaces of said shield elements.

3. A linear actuator as claimed in claim 2, wherein seals are provided between respective radially outer surfaces of said shield elements and respective radially inner surfaces of said actuator housing bore.

4. A linear actuator as claimed in claim 1, wherein respective rod end couplings are attached to distal ends of the ball screws.

5. A linear actuator as claimed in claim 1, wherein said drive coupling of said drive element is provided on an axially central region of the drive element, the tubular portions of the drive element extending in opposite directions from said central region.

6. A linear actuator as claimed in claim 1, further comprising a drive motor having an output shaft coupled with said drive element.

7. A linear actuator as claimed in claim 6, wherein said drive motor axially overlaps the drive element.

8. A linear actuator as claimed in claim 6, further comprising reduction gearing between said drive motor output shaft and said drive coupling of said drive element.

9. A linear actuator as claimed in claim 6, wherein said drive motor is an electric motor.

10. A linear actuator as claimed in claim 1, wherein the pitch of said first and second ball screws is the same.

11. A linear actuator as claimed in claim 1, wherein the pitch of said first and second ball screws is different.

12. A linear actuator as claimed in claim 1, wherein said drive element comprises slots or openings formed therein.

13. A linear actuator comprising:
an actuator housing defining a bore;
a drive element received in the actuator housing bore, said drive element comprising tubular portions receiving first and second ball nuts arranged at respective distal ends thereof and threaded in opposite directions to one another and further comprising a drive coupling;
first and second ball screws received within the drive element and operatively engaged with said first and second ball nuts, whereby rotation of said drive element and thus of said ball nuts relative to said ball screws causes said ball screws to move together in a linear path in opposite directions from one another,
first and second tubular shield elements arranged radially outwardly from said ball screws and coupled thereto for linear movement therewith, said shield elements being received in opposed ends of said actuator housing bore, wherein respective rod end couplings are attached to distal ends of the ball screws, and an end portion of the shield elements is located between a radially outer surface of the ball screws and a radially inner surface of a bore of the rod end coupling.

14. A linear actuator as claimed in claim 13, further comprising a seal provided between opposed radial surfaces of said shield elements and said rod end coupling.

* * * * *